US010933728B2

(12) United States Patent
Kawahara

(10) Patent No.: US 10,933,728 B2
(45) Date of Patent: Mar. 2, 2021

(54) DRIVING SOURCE SUPPORT STRUCTURE

(71) Applicant: HONDA MOTOR CO., LTD., Tokyo (JP)

(72) Inventor: Kazuya Kawahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 16/379,191

(22) Filed: Apr. 9, 2019

(65) Prior Publication Data
US 2019/0315218 A1 Oct. 17, 2019

(30) Foreign Application Priority Data

Apr. 11, 2018 (JP) .............................. JP2018-076251

(51) Int. Cl.
*B60K 5/12* (2006.01)

(52) U.S. Cl.
CPC .......... *B60K 5/1241* (2013.01); *B60K 5/1208* (2013.01)

(58) Field of Classification Search
CPC .. B60K 5/1241; B60K 5/1208; B60K 5/1225; B60K 5/1233
USPC ....................................................... 74/579 R
See application file for complete search history.

(56) References Cited

U.S. PATENT DOCUMENTS

| 8,967,599 B2* | 3/2015 | Yoneyama | B29C 45/14467 |
| | | | 267/141.1 |
| 2011/0233834 A1* | 9/2011 | Kashihara | F16F 1/3828 |
| | | | 267/140.4 |
| 2015/0008305 A1* | 1/2015 | Loeffelsender | F16F 1/3821 |
| | | | 248/638 |
| 2018/0201111 A1* | 7/2018 | Takahashi | B60K 5/12 |

FOREIGN PATENT DOCUMENTS

| DE | 3224935 A1 * | 1/1984 | ........... B60K 5/1208 |
| DE | 202013102964 U1 * | 7/2013 | ........... B60K 5/1241 |
| DE | 102016213155 A1 * | 1/2017 | ............. B60K 5/12 |
| FR | 2861337 A1 * | 4/2005 | ........... B60K 5/1241 |
| FR | 2992262 A1 * | 12/2013 | ........... B60K 5/1241 |
| FR | 2994244 A1 * | 2/2014 | ........... B60K 5/1233 |
| GB | 427104 A * | 4/1935 | ............. B60G 11/12 |

(Continued)

OTHER PUBLICATIONS

Office Action dated Dec. 4, 2019, issued in counterpart JP Application No. 2018-076251, with English translation. (8 pages).

*Primary Examiner* — Kimberly T Wood
(74) *Attorney, Agent, or Firm* — Westerman, Hattori, Daniels & Adrian, LLP

(57) ABSTRACT

A torque rod 16 which supports a driving source 11 on a vehicle body 15 includes: an annular first end part 17 which is connected to the driving source 11 while holding a first elastic bush 21 in an inner circumference thereof; an annular second end part 18 which is connected to the vehicle body 15 while holding a second elastic bush 23 in an inner circumference thereof; and a rod-shaped coupling part 19 which couples the first end part 17 and the second end part (Continued)

18 to each other. An outer circumferential face of the first end part 17 includes a projection part 17a which projects radially outward so as to extend away from the second end part 18, and a mounting part 17b to mount a mass body 26 is formed in the projection part 17a.

9 Claims, 6 Drawing Sheets

(56) References Cited

FOREIGN PATENT DOCUMENTS

| | | | |
|---|---|---|---|
| JP | 2004-66899 | A | 3/2004 |
| JP | 2007-333029 | A | 12/2007 |
| JP | 2008-94248 | A | 4/2008 |
| JP | 2008-95821 | A | 4/2008 |
| JP | 2009-298217 | A | 12/2009 |
| JP | 2010-31894 | A | 2/2010 |
| JP | 2013-112042 | A | 6/2013 |
| JP | 2014-88914 | A | 5/2014 |
| JP | 2016-70333 | A | 5/2016 |
| JP | 2016-217487 | A | 12/2016 |
| WO | 2002/042662 | A1 | 5/2002 |
| WO | 2013/125677 | A1 | 8/2013 |

\* cited by examiner (A)

(B)

DRIVING SOURCE SUPPORT STRUCTURE

CROSS-REFERENCE OF RELATED APPLICATION

This application claims priority of Japanese Patent Application No. 2018-076251 filed in Japan on Apr. 11, 2018, the entire contents of which are incorporated herein by reference.

TECHNICAL FIELD

The present invention relates to a driving source support structure for supporting a driving source on a vehicle body with a torque rod including: an annular first end part which is connected to the driving source while holding a first elastic bush in an inner circumference thereof; an annular second end part which is connected to the vehicle body while holding a second elastic bush in an inner circumference thereof; and a coupling part which couples the first end part and the second end part to each other.

BACKGROUND OF THE INVENTION

A torque rod is known by Japanese Patent Application Publication No. 2007-333029, in which a rubber bush is housed an annular portion provided in an end part of the torque rod and a mass body that functions as a dynamic damper is bonded by vulcanization to the rubber bush that extends to the outside through an opening formed in the annular portion.

However, in the above existing torque rod, since the mass body is mounted on the rubber member by vulcanization bonding, the heat of a high-temperature member such as an exhaust pipe disposed in an engine room facilitates deterioration of the rubber member, which might make the mass body fall off from the torque rod.

The rubber member can be prevented from being exposed to deterioration effect by mechanically fastening the mass body to an end part of the torque rod, but this makes it difficult to secure a space to dispose the torque rod in the narrow engine room unless the mass body is mounted on the torque rod in a compact fashion.

In view of the aforementioned circumstances, there is a need to provide a driving source support structure which can mount an antivibration mass body on a torque rod firmly and compactly.

SUMMARY OF INVENTION

In a first embodiment according to the present invention, a driving source support structure is provided for supporting a driving source on a vehicle body with a torque rod including: an annular first end part which is connected to the driving source while holding a first elastic bush in an inner circumference thereof; an annular second end part which is connected to the vehicle body while holding a second elastic bush in an inner circumference thereof; and a coupling part which couples the first end part and the second end part to each other, the structure being characterized in that an outer circumferential face (surface) of the first end part includes a projection part which projects radially outward so as to extend away from the second end part, and a mounting part to mount a mass body is formed in the projection part.

Further, in accordance with a second embodiment of the present invention, the driving source support structure is characterized in that, in addition to the configuration of the first embodiment, a height of the projection part in a circumferential direction of the first end part is smaller than a diameter of the first end part.

Further, in accordance with a third embodiment of the present invention, the driving source support structure is characterized in that, in addition to the configuration of the first or second embodiment, the mass body is fastened to the mounting part of the projection part with a fastening member, and the projection part and the mass body are each provided with a rotation stopper which prevents rotation of the mass body about the fastening member.

Further, in accordance with a fourth embodiment of the present invention, the driving source support structure is characterized in that, in addition to the configuration of the third embodiment, the rotation stopper is constituted of: a first contact face (surface) which is provided on the outer circumferential face (surface) of the first end part; and a second contact face (surface) which is provided in the mass body and in contact with the first contact face.

Further, in accordance with a fifth embodiment of the present invention, the driving source support structure is characterized in that, in addition to the configuration of any one of the first to fourth embodiments, the projection part has an inclined face (surface) which extends obliquely upward from a lower face (surface) of the first end part.

Further, in accordance with a sixth embodiment of the present invention, the driving source support structure is characterized in that, in addition to the configuration of anyone of the first to fifth embodiments, the first end part is connected to the driving source through a mounting bracket to which a collar penetrating the first elastic bush is fastened, the mounting bracket includes: a mounting wall which is fastened to the driving source; and paired support walls which stand on both edges of the mounting wall and support the first end part so as to sandwich the first end part therebetween, and at least one of the support walls shields the first elastic bush and the mass body against a high-temperature member.

Further, in accordance with a seventh embodiment of the present invention, the driving source support structure is characterized in that, in addition to the configuration of the sixth embodiment, the mounting wall of the mounting bracket includes fastening parts which are fastened to the driving source, the one support wall partially overlaps with an axis line of the coupling part, and the fastening parts are laterally offset with respect to the axis line of the coupling part.

Further, in accordance with an eight embodiment of the present invention, the driving source support structure is characterized in that, in addition to the configuration of the seventh embodiment, the support walls of the mounting bracket each include a support part to which the collar is fastened, and the paired fastening parts of the mounting wall and the support part are located at three vertices of a virtual triangle.

Further, in accordance with a ninth embodiment of the present invention, the driving source support structure is characterized in that, in addition to the configuration of the seventh or eighth embodiment, an annular bulging part to surround each fastening part is formed in the mounting wall of the mounting bracket.

Further, in accordance with a tenth embodiment of the present invention, the driving source support structure is characterized in that, in addition to the configuration of the eighth or ninth embodiment, the support parts of the support walls of the mounting bracket are constituted of paired fastening holes through which a fastening member penetrates, and one of the fastening holes is notched in a direction away from the mounting wall and opens in an edge of the corresponding support wall.

Note that, an engine 11 of an embodiment corresponds to the driving source of the present invention, bolt holes 14e of the embodiment correspond to the fastening parts of the present invention, bolt holes 14f, 14g of the embodiment correspond to the support parts or the fastening holes of the present invention, a cross member 15 of the embodiment corresponds to the vehicle body of the present invention, a first contact face 17d and a second contact face 26c of the embodiment correspond to the rotation stopper of the present invention, bolts 27, 34 of the embodiment correspond to the fastening member of the present invention, and an exhaust pipe 37 of the embodiment corresponds to the high-temperature member of the present invention.

Effect of the Invention

According to the configuration of the first embodiment, the torque rod which supports the driving source on the vehicle body includes: the annular first end part which is connected to the driving source while holding the first elastic bush in the inner circumference thereof; the annular second end part which is connected to the vehicle body while holding the second elastic bush in the inner circumference thereof; and the coupling part which couples the first end part and the second end part to each other. The outer circumferential face of the first end part includes the projection part which projects radially outward so as to extend away from the second end part, and the mounting part to mount the mass body is formed in the projection part. This enables the mass body to suppress the vibration of the torque rod, enables the mass body to be mounted on the torque rod in a compact fashion, and enables the mass body to be mounted on the torque rod reliably without influence of thermal deterioration and aged deterioration.

Further, according to the configuration of the second embodiment, the height of the projection part in the circumferential direction of the first end part is smaller than the diameter of the first end part. Thereby, it is possible to prevent a size increase of the projection part including the mass body and make the entire torque rod compact.

Further, according to the configuration of the third embodiment, the mass body is fastened to the mounting part of the projection part with the fastening member, and the projection part and the mass body are each provided with the rotation stopper which prevents rotation of the mass body about the fastening member. Thereby, it is possible to position the first end part and the mass body relative to each other with the rotation stopper and improve the operability of fastening the mass body to the projection part with the fastening member.

Further, according to the configuration of the fourth embodiment, the rotation stopper is constituted of: the first contact face which is provided on the outer circumferential face of the first end part; and the second contact face which is provided in the mass body and in contact with the first contact face. Thereby, it is possible to position the first end part and the mass body with a simple structure.

Further, according to the configuration of the fifth embodiment, the projection part has the inclined face which extends obliquely upward from the lower face of the first end part. Thereby, it is possible to prevent the projection part from interfering with a member located below the torque rod and easily secure a space to dispose the torque rod.

Further, according to the configuration of the sixth embodiment, the first end part is connected to the driving source through the mounting bracket to which the collar penetrating the first elastic bush is fastened, the mounting bracket includes: the mounting wall which is fastened to the driving source; and the paired support walls which stand on both edges of the mounting wall and support the first end part so as to sandwich the first end part therebetween, and at least one of the support walls shields the first elastic bush and the mass body against the high-temperature member. Thereby, it is possible to prevent the heat from the high-temperature member from acting on the first elastic bush and prevent the heat of the mass body, increased in temperature by the action of the heat from the high-temperature member, from acting on the first elastic bush, and thus enhance the durability of the first elastic bush.

Further, according to the configuration of the seventh embodiment, the mounting wall of the mounting bracket includes the fastening parts which are fastened to the driving source, the one support wall partially overlaps with the axis line of the coupling part, and the fastening parts are laterally offset with respect to the axis line of the coupling part. Thereby, it is possible not only to reliably shield the first elastic bush and the mass body against the high-temperature member with the one support wall, but also to make the mounting bracket not easy to fall in a lateral direction when the mounting bracket is applied with a transverse load (a load in a direction orthogonal to the axis line of the coupling part) by the torque rod and to freely set the installation position of the mounting bracket with respect to the driving source.

Further, according to the configuration of the eighth embodiment, the support walls of the mounting bracket each include the support part to which the collar is fastened, and the paired fastening parts of the mounting wall and the support part are located at the three vertices of a virtual triangle. Thereby, it is possible to enhance the rigidity of the support walls of the mounting bracket effectively and firmly support the torque rod.

Further, according to the configuration of the ninth embodiment, the annular bulging part to surround each fastening part is formed in the mounting wall of the mounting bracket. Thereby, it is possible to enhance the rigidity of the circumference of each fastening part with the bulging part and firmly fix the mounting bracket to the driving source.

Further, according to the configuration of the tenth embodiment, the support parts of the support walls of the mounting bracket are constituted of the paired fastening holes through which the fastening member penetrates, and one of the fastening holes is notched in the direction away from the mounting wall and opens in the edge of the corresponding support wall. Thereby, even when the fastening member interferes with another member and cannot be wholly pulled out in its axial direction, it is possible to detach the fastening member from the mounting bracket in a direction orthogonal to the axis by simply pulling only the tip of the fastening member out of the other fastening hole, which enables the torque rod to be attached to or detached from the mounting bracket easily.

DETAILED DESCRIPTION OF EMBODIMENTS OF THE INVENTION

Hereinbelow, an embodiment of the present invention is described based on FIGS. 1 to 6.

Figure 1:
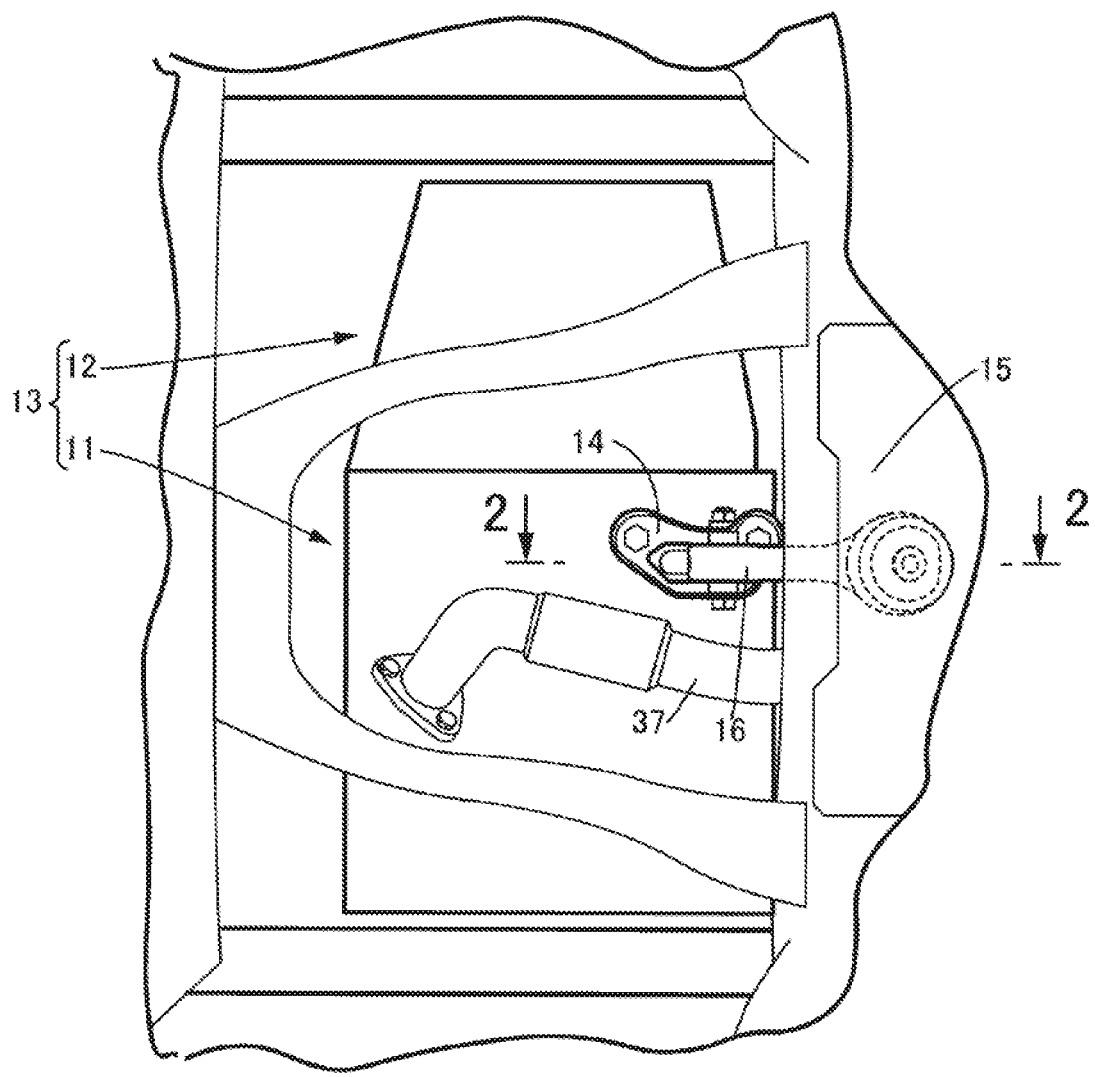
FIG. 1 is a bottom view of an engine room of an automobile.
Figure 2:
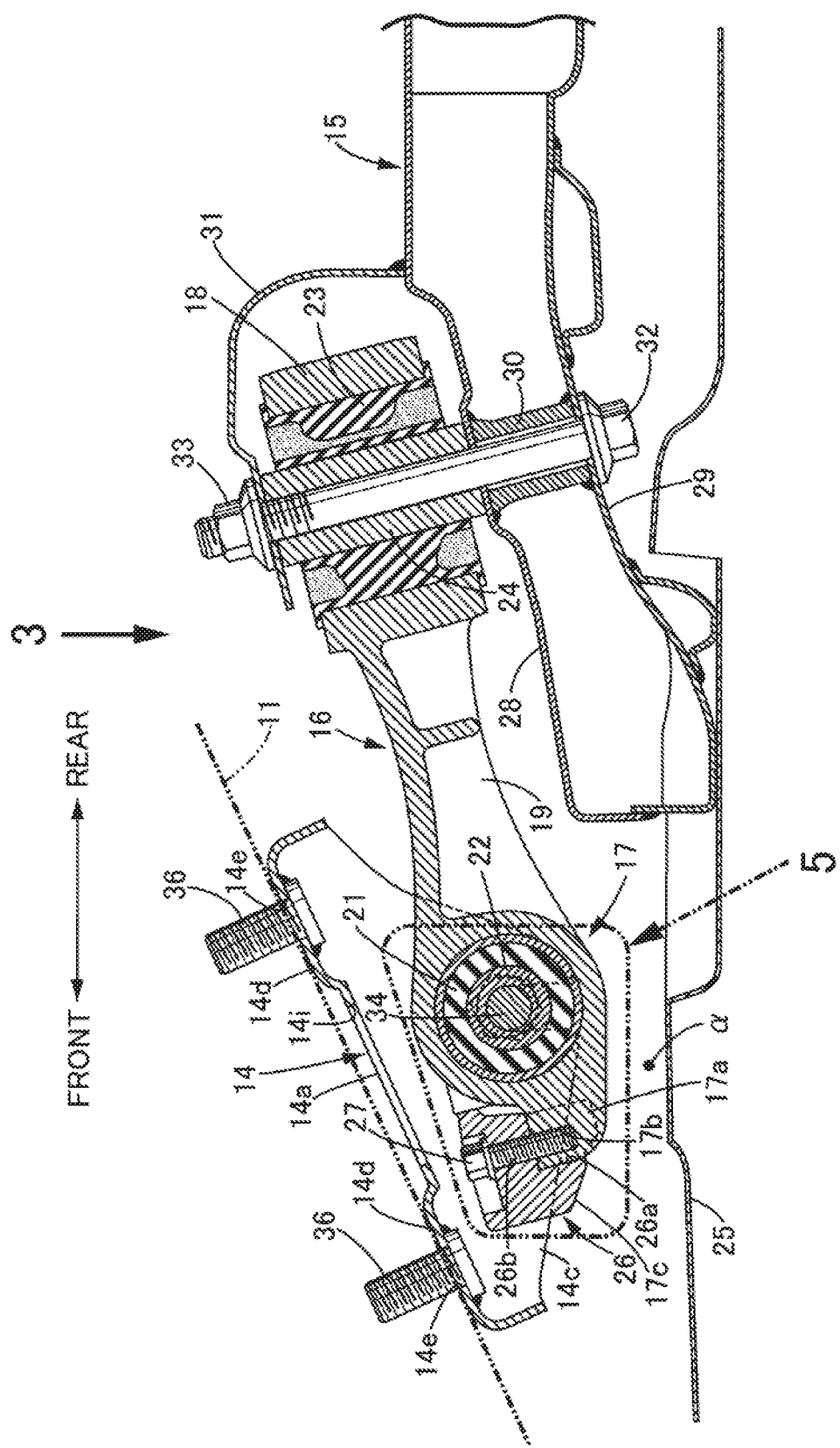
FIG. 2 is an enlarged sectional view taken along the line 2-2 in FIG. 1.

FIG. 1 is a view of an engine room of an automobile seen from below, in which a power train 13 made by combining an engine 11 and a transmission 12 into one unit is mounted in a transverse posture where a crankshaft of the engine 11 is disposed in a vehicle-widthwise direction. The power train 13 is elastically supported on a body frame by multiple antivibration mounts (not illustrated), and a mounting bracket 14 and a body cross member 15 which are provided on a rear lower face of the engine 11 are connected to a torque rod 16 disposed in a longitudinal direction. The torque rod 16, which is elastically connected at its front and rear ends to the mounting bracket 14 and the cross member 15 respectively, is designed to inhibit the power train 13 from falling in the longitudinal direction when the automobile accelerates or decelerates.

As illustrated in FIGS. 2 to 5, the torque rod 16 includes: an annular first end part 17; an annular second end part 18; and a rod-shaped coupling part 19 which couples the first end part 17 and the second end part 18 in one unit. An outer circumferential face of a rubber first elastic bush 21 is fixed on an inner circumferential face of the first end part 17 with a small diameter, and an outer circumferential face of a collar 22 is fixed on an inner circumferential face of the first elastic bush 21. The first elastic bush 21 and the collar 22 are arranged with their axis lines directed in the vehicle-widthwise direction. An outer circumferential face of a rubber second elastic bush 23 is fixed on an inner circumferential face of the second end part 18 with a large diameter, and an outer circumferential face of a collar 24 is fixed on an inner circumferential face of the second elastic bush 23. The second elastic bush 23 and the collar 24 are arranged with their axis lines directed in a substantially vertical direction. The first elastic bush 21 is solid whereas the second elastic bush 23 has multiple thinned parts.

A block-shaped projection part 17a projects forward from a lower half portion of the first end part 17 of the torque rod 16. A mounting part 17b constituted of a bolt hole is formed in an upper face of the projection part 17a, and an inclined face 17c which inclines upward toward the front with respect to an axis line L of the torque rod 16 is formed in a lower face of the projection part 17a. Thus, a predetermined clearance α is secured between the inclined face 17c of the projection part 17a and an under cover 25 which covers the engine room from below (see FIG. 2). A height H of the projection part 17a is about the half of a diameter D of the first end part 17, and therefore the projection part 17a is located in a lower half portion of a front face of the first end part 17 (see Parts (A) and (B) of FIG. 5).

A mass body 26 mounted on the first end part 17 of the torque rod 16 includes a recessed part 26a which opens in rear and lower faces thereof. The mass body 26 is fixed on the projection part 17a in such a way that, while the recessed part 26a is fitted to the projection part 17a of the first end part 17, a bolt 27 which is inserted from above into a bolt hole 26b vertically penetrating the mass body 26 is screwed into the mounting part 17b constituted of a female screw of the projection part 17a. In a state where the mass body 26 is mounted on the first end part, a first contact face 17d of the first end part is in contact with a second contact face 26c provide in the mass body 26.

The cross member 15 is a hollow, closed section member made by combining an upper member 28 and a lower member 29 together with a collar 30 sandwiched therebetween. The second end part 18 of the torque rod 16 is elastically connected to the cross member 15 in such a way that, while the collar 24 of the second end part 18 of the torque rod 16 is sandwiched between a bracket 31 fixed on an upper face of the upper member 28 and the upper member 28, a nut 33 is screwed onto a bolt 32 which penetrates the lower member 29, the collar 30, the upper member 28, the collar 24, and the bracket 31.

The mounting bracket 14 which connects the first end part 17 of the torque rod 16 to the engine 11 is made by press molding a metal sheet, and includes: a mounting wall 14a which is fastened to the engine 11; and paired support walls 14b, 14c which stand on both left and right edges of the mounting wall 14a. The mounting wall 14a curves in a dogleg shape in such a way that its both end parts in the longitudinal direction extend laterally away from the axis line L of the torque rod 16. Bulging parts 14d, 14d which bulge annularly are formed in both end parts in the longitudinal direction of the mounting wall 14a, and bolt holes 14e, 14e are formed at the centers of the respective bulging parts 14d, 14d.

The paired support walls 14b, 14c are substantially triangular in the side view, and have bolt holes 14f, 14g formed at positions corresponding to their respective vertices away from the mounting wall 14a. Accordingly, in one support wall 14b, the paired bolt holes 14e, 14e of the mounting wall 14a and the bolt hole 14f of the support wall 14b are arranged at positions corresponding to the three vertices of a triangle respectively and, in the other support wall 14c, the paired bolt holes 14e, 14e of the mounting wall 14a and the bolt hole 14g of the support wall 14c are arranged at positions corresponding to the three vertices of a triangle respectively. Besides, a quadrangular thinning hole 14i is formed in a central part of the mounting wall 14a.

The mounting bracket 14 is mounted on the engine 11 with two bolts 36, 36 which penetrate the bolt holes 14e, 14e of the mounting wall 14a, and the first end part 17 of the torque rod 16 is mounted on the mounting bracket 14 by fastening it between the paired support walls 14b, 14c of the mounting bracket 14 with the bolt 34 and the nut 35 while the collar 22 is sandwiched therebetween.

Figure 3:
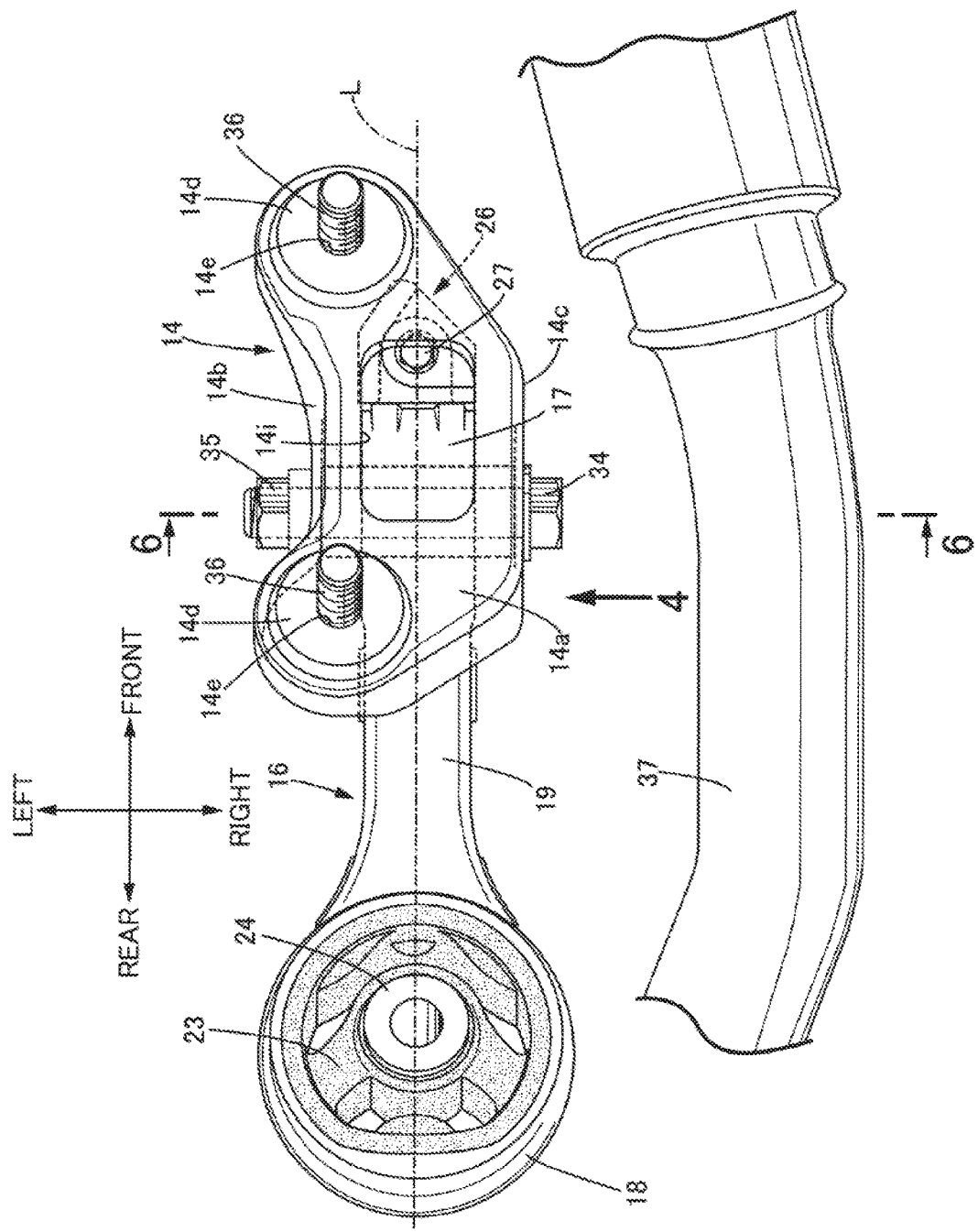
FIG. 3 is a view seen in the direction indicated by the arrow 3 in FIG. 2.
Figure 4:
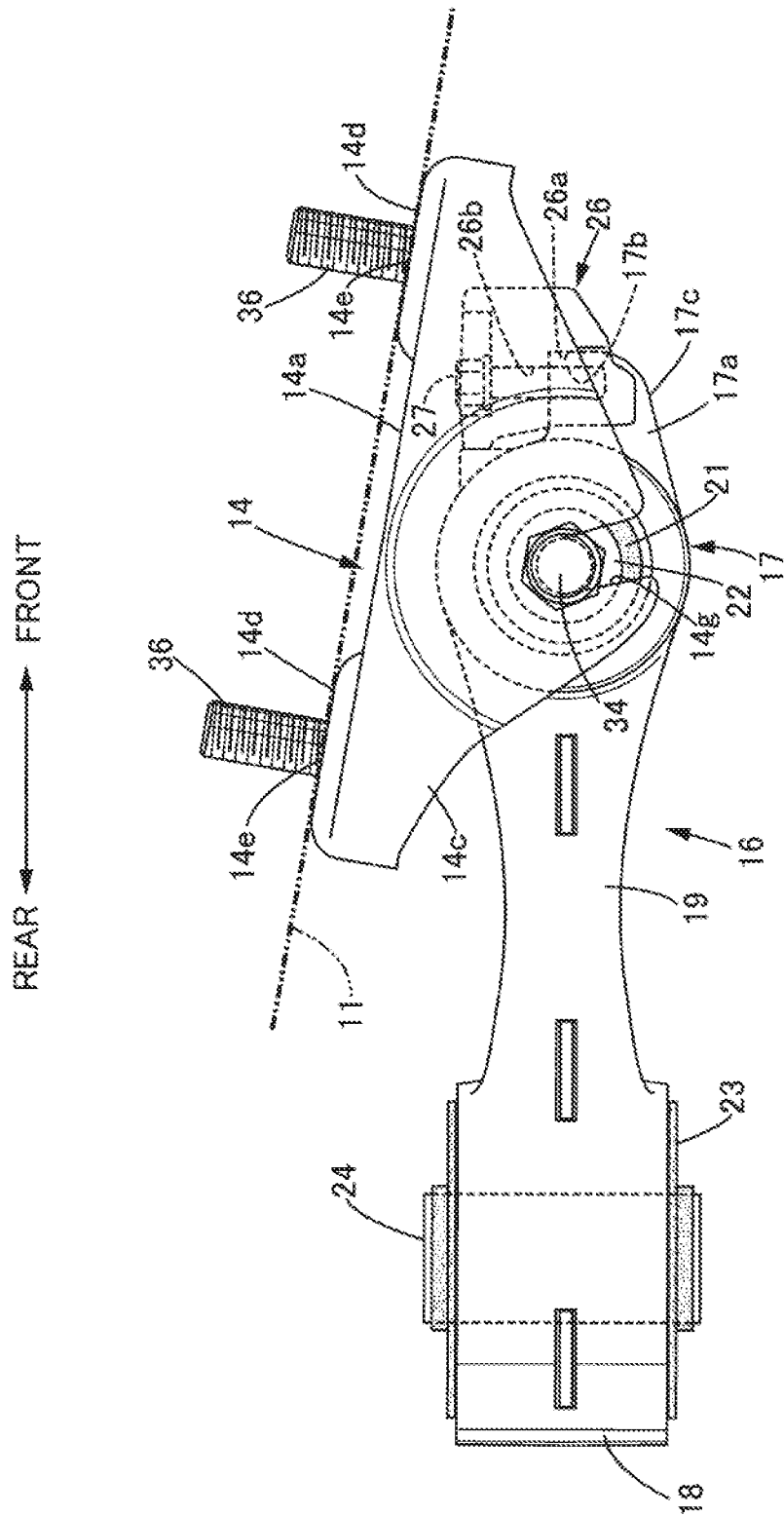
FIG. 4 is a view seen in the direction indicated by the arrow 4 in FIG. 3.
Figure 5:
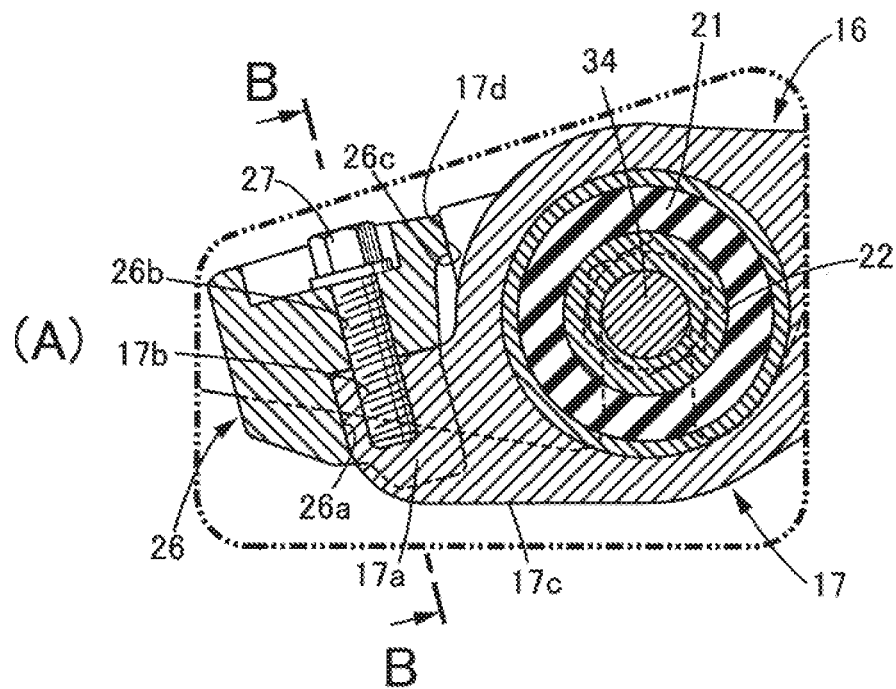
FIGS. 5(A) and 5(B) are each an enlarged view of the portion 5 in FIG. 2.
Figure 5:
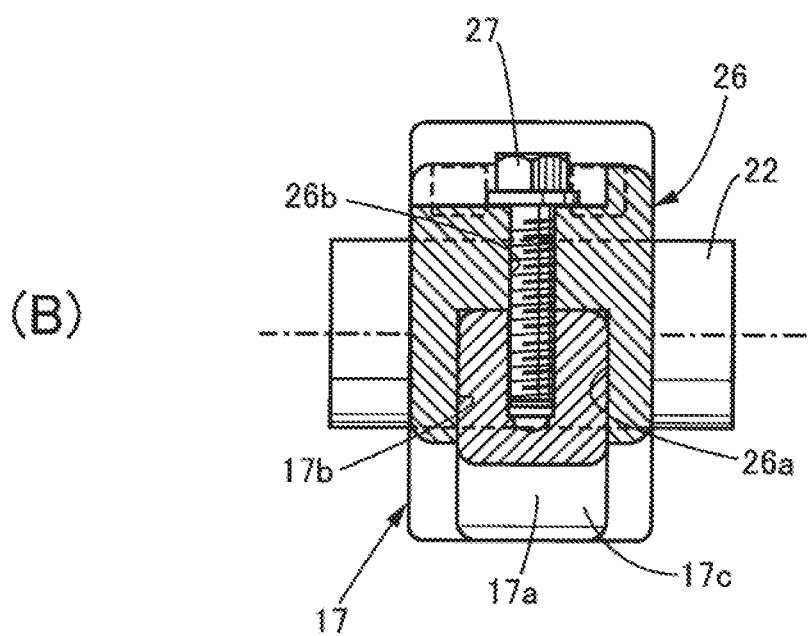
Figure 6:
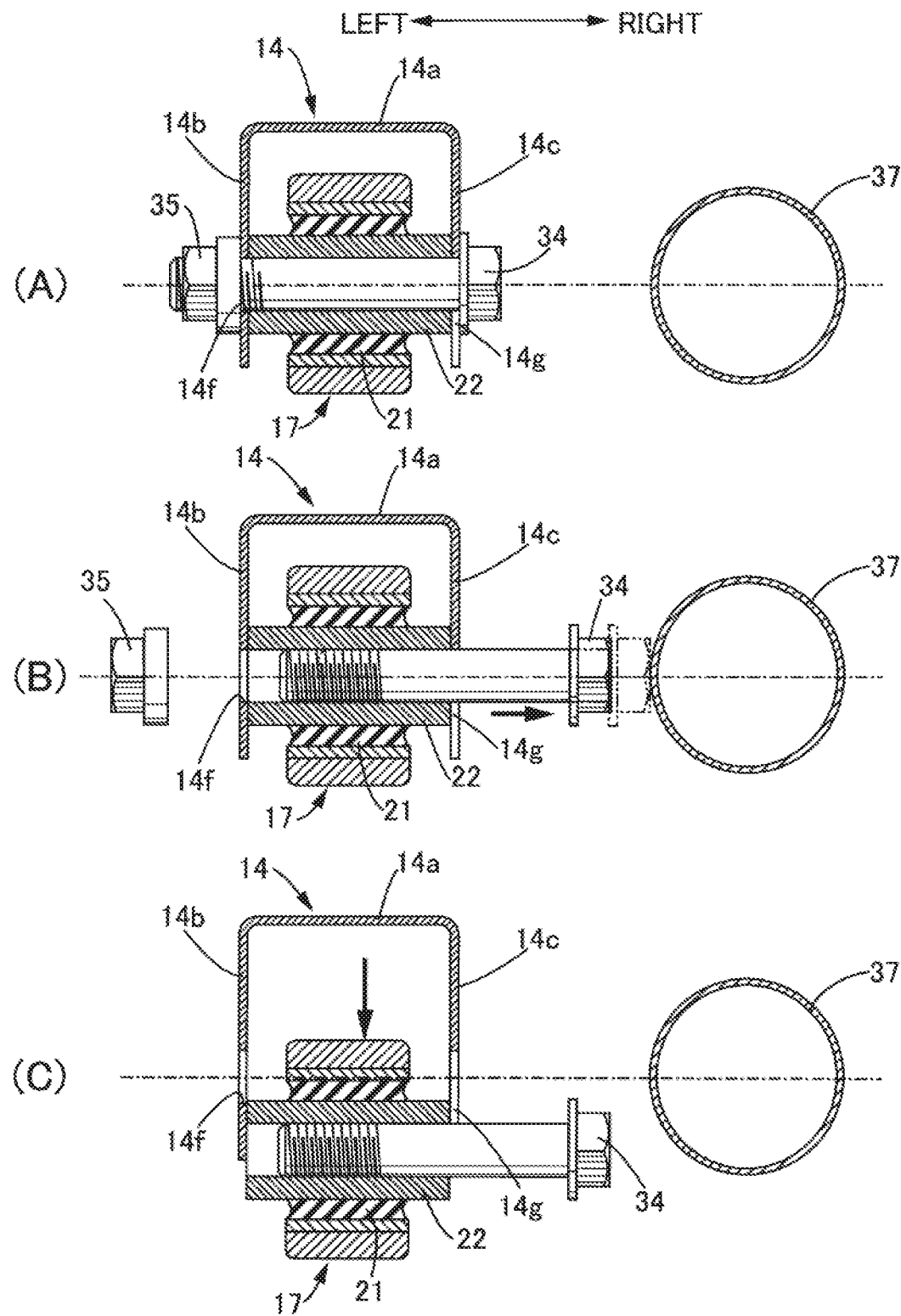
FIGS. 6(A), 6(B), and 6(C) are each a sectional view taken along the line 6-6 in FIG. 3.

In the engine room, an exhaust pipe 37 which extends rearward from the engine 11 is disposed on the right side of, and close to, the torque rod 16 and the mounting bracket 14 (see FIGS. 1 and 3). The bolt hole 14g of the right support wall 14c of the mounting bracket 14 which is opposed to the exhaust pipe 37 has a downward notch and opens in a lower edge of the support wall 14c (see FIG. 4).

Next, a description is given of an operation of the embodiment of the present invention having the above configuration.

The power train 13 which is mounted transversely with the crankshaft of the engine 11 extending in the vehicle-widthwise direction is supported on both left and right sides thereof by the antivibration mounts, and therefore it tries to incline in the longitudinal direction about the axis line extending in the vehicle-widthwise direction by an inertial force generated when a vehicle body accelerates sharply or decelerates sharply or by a reaction-force torque generated when engine revolutions increase or decrease sharply. When the power train 13 tries to incline in the longitudinal direction in this manner, the inclination of the power train 13 can be inhibited since the torque rod 16 connects a lower part of the engine 11 and the vehicle body cross member 15 to each other in the longitudinal direction.

By coupling the engine 11 to the vehicle body with the torque rod 16, the vibration of the engine 11 is transmitted to the vehicle body. However, since the first end part 17 of the torque rod 16 is connected to the engine 11 via the first elastic bush 21, and the second end part 18 thereof is connected to the vehicle body via the second elastic bush 23, the vibration of the engine 11 is absorbed by the first elastic bush 21 and the second elastic bush 23, which prevents the vibration from being transmitted to the vehicle body.

The torque rod 16 has its natural frequency determined by its mass and the spring constants of the first elastic bush 21 and the second elastic bush 23. If a frequency input from the engine 11 coincides with the natural frequency of the torque rod 16, sympathetic vibration occurs and might deteriorate the vibration/noise characteristics of a vehicle compartment.

However, according to this embodiment, since the first end part 17 where the torque rod 16 is connected to the engine 11 is provided with the mass body 26, it is possible to make the natural frequency of the torque rod 16 differ from the frequency of the engine 11 in the usual operating range, and thereby prevent sympathetic vibration of the torque rod 16 and improve the vibration/noise characteristics of the vehicle compartment. In addition, since the mass body 26 is not mounted via an elastic body such as rubber, it is possible to mount the mass body 26 on the torque rod 16 reliably without influence of thermal deterioration and aged deterioration of rubber.

When mounted on the torque rod 16, the mass body 26 needs to be mounted in a compact fashion so as not to degrade the layout quality of the torque rod 16. In this embodiment, the first end part 17 of the torque rod 16 is provided with the projection part 17a lower in height than the diameter of the first end part, and the mass body 26 is fitted at its recessed part 26a to the projection part 17a and fastened thereto with the bolt 27. This makes it possible to set the mass body 26 having a sufficiently large volume between the upper and lower ends of the first end part 17 of the torque rod 16, and thereby make compact the torque rod 16 including the mass body 26 and achieve the good layout quality in the engine room.

In addition, when the mass body 26 is fastened to the projection part 17a of the first end part 17 with the bolt 27, the first contact face 17d provided on the outer circumferential face of the first end part 17 and the second contact face 26c provided in the mass body 26 are brought into contact with each other to position the mass body 26 with respect to the first end part 17. Thereby, it is possible to improve the operability of fastening the mass body 26 to the projection part 17a of the first end part 17 with the bolt 27.

Further, the under cover 25 (see FIG. 2) is disposed below the torque rod 16. Thus, even when the elastically-supported power train 13 is swung and a lower face of the first end part 17 of the torque rod 16 is brought closer to the under cover 25, the inclined face 17c which is the lower face of the projection part 17a provided in the first end part 17 and a lower face of the mass body 26 mounted on the projection part 17a extend obliquely upward on their front sides, which makes it possible to prevent the first end part and the mass body from interfering with the under cover 25 and secure a space to dispose the torque rod 16 easily.

Furthermore, the mounting bracket 14 which connects the first end part 17 of the torque rod 16 to the engine 11 includes: the mounting wall 14a which is fastened to the engine 11 with the bolts 36, 36; and the paired support walls 14b, 14c which stand on both edges of the mounting wall 14a and support the first end part 17 of the torque rod 16 so as to sandwich it therebetween, and one support wall 14c is opposed to the exhaust pipe 37 which passes near the mounting bracket 14. While the outer circumferential face of the rubber first elastic bush 21 held by the first end part 17 is covered with the annular first end part 17, a side face of the first elastic bush 21 is exposed. Thus, it might be deteriorated by the heat of the high-temperature exhaust pipe 37 and its durability might be decreased.

However, according to this embodiment, since the support wall 14c of the mounting bracket 14 on the exhaust pipe 37 side thereof covers the exposed side face of the first elastic bush 21 and a side face of the mass body 26, it is possible to block the heat of the high-temperature exhaust pipe 37 with the support wall 14c. This makes it possible to suppress a heat increase of the first elastic bush 21 and the mass body 26, suppress a direct heat increase of the first elastic bush 21 by the heat of the exhaust pipe 37 and an indirect heat increase of the first elastic bush 21 by the heat of the mass body 26 increased in temperature, and thereby prevent a decrease in the durability of the first elastic bush 21.

In addition, although the mounting bracket 14 has a simple structure made by press molding a metal sheet, it has such a high rigidity that it can support the first end part 17 of the torque rod 16 reliably.

Specifically, since the mounting wall 14a of the mounting bracket 14 curves in a dogleg shape and the positions of the bolt holes 14e, 14e in its both ends are laterally offset with respect to the axis line L of the torque rod 16 (see FIG. 3), it is possible to make the mounting bracket 14 not easy to fall in the lateral direction when being applied with the transverse load from the torque rod 16 in a direction orthogonal to the axis line L.

In addition, when seen in the vertical direction, the support wall 14c of the mounting bracket 14 on the exhaust pipe 37 side thereof overlaps with the axis line L of the coupling part 19 of the torque rod 16. Thereby, it is possible not only to reliably shield the first elastic bush 21 of the torque rod 16 and the mass body 26 against the high-temperature exhaust pipe 37 with the support wall 14c, but also to freely set the installation position of the mounting bracket 14 with respect to the engine 11.

Further, when seen in the direction orthogonal to the axis line L of the torque rod 16, the paired support walls 14b, 14c of the mounting bracket 14 have a triangular shape with the two vertices located at the positions of the two front and rear bolt holes 14e, 14e of the mounting wall 14a and the rest of the vertices located at the bolt holes 14f, 14g at the centers of the respective support walls 14b, 14c. This makes it possible to enhance the rigidity of the support walls 14b, 14c of the mounting bracket 14 effectively and firmly support the torque rod 16.

Furthermore, the circumferences of the front and rear bolt holes 14e, 14e in the mounting wall 14a of the mounting bracket 14 are respectively surrounded by the circular bulging parts 14d, 14d and reinforced. This makes it possible to enhance the rigidity of the mounting wall 14a and fix the mounting bracket 14 firmly to the engine 11.

As illustrated in FIG. 6(A), the exhaust pipe 37 is disposed adjacent laterally to the mounting bracket 14. For this reason, as illustrated in FIG. 6(B), there is a problem that, when one tries to pull the bolt 34 out to the right side in the drawing in order to detach the first end part 17 of the torque rod 16 from the mounting bracket 14, the bolt 34 cannot be pulled out because its head interferes with the exhaust pipe 37.

However, according to this embodiment, the bolt hole 14g in the support wall 14c of the mounting bracket 14 on the exhaust pipe 37 side thereof opens downward in the drawing. Thus, as long as the tip of the bolt 34 passes through the bolt hole 14f of the support wall 14b on the left side in the drawing, as illustrated in FIG. 6(C), the first end part 17 can be pulled out to the lower side in the drawing together with the bolt 34 through the bolt hole 14g which opens downward, thereby improving the operability significantly. The work of mounting the first end part 17 to the mounting bracket 14 can also be done easily by an inverse procedure to the above procedure.

Although the embodiment of the present invention has been described above, various design changes can be made to the present invention within a scope not departing from the gist thereof.

For example, the driving source of the present invention is not limited to the engine 11 of the embodiment and may be another kind of driving source such as an electric motor.

Further, the vehicle body of the present invention is not limited to the cross member 15 of the embodiment and may be another frame member such as a front subframe.

The invention claimed is:

1. A driving source support structure for supporting a driving source on a vehicle body, comprising:
    a torque rod with which said driving source is mounted on said vehicle body and which comprises;
        an annular first end part connected to said driving source and holding a first elastic bush in an inner circumference of said annular first end part;
        an annular second end part connected to said vehicle body and holding a second elastic bush in an inner circumference of said annular second end part; and
        a coupling part configured to couple said first end part and said second end part to each other, wherein
    said first end part comprises a projection part formed at an outer circumferential surface of said first end part, said projection part projecting radially outward so as to extend away from said second end part and having a mounting part on which a mass body is mounted, and
    the driving source support structure further comprises;
        a fastening member with which said mass body is fastened to said mounting part of said projection part; and
        a rotation stopper provided to said projection part and said mass body such that the rotation stopper prevents rotation of said mass body about said fastening member.

2. The driving source support structure according to claim 1, wherein a height of said projection part in a circumferential direction of said first end part is smaller than a diameter of said first end part.

3. The driving source support structure according to claim 1, wherein said rotation stopper comprises a first contact surface provided with the outer circumferential surface of said first end part and a second contact surface provided with said mass body such that said second contact surface is in contact with said first contact surface.

4. The driving source support structure according to claim 1, wherein said projection part has an inclined surface which extends obliquely upward from a lower surface of said first end part.

5. The driving source support structure according to claim 1, further comprising: a collar which penetrates said first elastic bush; and a mounting bracket to which the collar is fastened, wherein
    said first end part is connected to said driving source through the mounting bracket,
    said mounting bracket comprises: a mounting wall fastened to said driving source; and paired support walls extending from edges of said mounting wall and holding said first end part between the paired support walls so as to support said first end part, and
    at least one of said paired support walls is configured to shield said first elastic bush and said mass body against a high-temperature member.

6. The driving source support structure according to claim 5, wherein
    said mounting wall of said mounting bracket comprises fastening parts fastened to said driving source,
    said one support wall partially overlaps with an axis line of said coupling part, and
    said fastening parts are laterally offset with respect to said axis line of said coupling part.

7. The driving source support structure according to claim 6, wherein
    said support walls of said mounting bracket each comprise support parts to which said collar is fastened, and
    said fastening parts of said mounting wall and said support parts are located at three vertices of a virtual triangle.

8. The driving source support structure according to claim 6, wherein
    an annular bulging part to surround each fastening part is formed in said mounting wall of said mounting bracket.

9. The driving source support structure according to claim 7, wherein
    said support parts of said support walls of said mounting bracket are constituted of paired fastening holes through which a fastening member penetrates, and
    one of said fastening holes is notched in a direction away from said mounting wall and opens in an edge of said corresponding support wall.

* * * * *